(12) United States Patent
Wang et al.

(10) Patent No.: US 10,122,262 B1
(45) Date of Patent: Nov. 6, 2018

(54) POWER FACTOR CORRECTION CIRCUIT

(71) Applicant: NXP USA, INC., Austin, TX (US)

(72) Inventors: Dechang Wang, Suzhou (CN); Yangjie Zhang, Suzhou (CN); Xiang Gao, Shanghai (CN); Lingling Wang, Shanghai (CN)

(73) Assignee: NXP USA, INC., Austin, TX (US)

( * ) Notice: Subject to any disclaimer, the term of this patent is extended or adjusted under 35 U.S.C. 154(b) by 0 days.

(21) Appl. No.: 16/028,234

(22) Filed: Jul. 5, 2018

(51) Int. Cl.
| | |
|---|---|
| *G05F 1/70* | (2006.01) |
| *H02M 7/219* | (2006.01) |
| *H02M 1/42* | (2007.01) |
| *H02J 50/10* | (2016.01) |

(52) U.S. Cl.
CPC ............ *H02M 1/4225* (2013.01); *G05F 1/70* (2013.01); *H02J 50/10* (2016.02); *H02M 7/219* (2013.01)

(58) Field of Classification Search
CPC ............ G05F 1/70; H02M 2001/0009; H02M 1/4208; H02M 1/4233; H02M 7/219
USPC .......... 318/400.26; 323/358; 363/64, 76, 77, 363/84, 88–90, 93, 127
See application file for complete search history.

(56) References Cited

U.S. PATENT DOCUMENTS

| | | | |
|---|---|---|---|
| 8,983,374 B2 | 3/2015 | Wiley | |
| 9,178,387 B2 | 11/2015 | Mohammadian et al. | |
| 9,450,648 B2 | 9/2016 | Bastami | |
| 9,465,064 B2 | 10/2016 | Roy et al. | |
| 9,474,031 B1 | 10/2016 | Sedzin et al. | |
| 9,530,558 B2 | 12/2016 | Nakano et al. | |
| 2011/0075462 A1* | 3/2011 | Wildash | H02M 1/4208 363/127 |
| 2013/0257168 A1 | 10/2013 | Singh | |
| 2014/0268952 A1* | 9/2014 | Tong | H02M 1/4241 363/89 |
| 2014/0333145 A1 | 11/2014 | Lee et al. | |
| 2014/0361738 A1 | 12/2014 | Lee et al. | |
| 2015/0198640 A1 | 7/2015 | Lee | |
| 2015/0280547 A1* | 10/2015 | Pu | H02M 1/4225 363/89 |
| 2015/0318708 A1 | 11/2015 | Bartlett | |
| 2016/0028304 A1* | 1/2016 | O'Day | H02M 1/4225 363/89 |
| 2016/0190852 A1 | 6/2016 | Chiang et al. | |

FOREIGN PATENT DOCUMENTS

CN 205027804 U 2/2016

* cited by examiner

*Primary Examiner* — Gary Nash
(74) *Attorney, Agent, or Firm* — Charles E. Bergere (57) ABSTRACT

A bridgeless power factor correction (PFC) circuit has first and second nodes, and first and second current paths connected between the first and second nodes. The first current path includes a first semiconductor device and a first switch element, and the second current path includes a second semiconductor device and a second switch element. One of the first and the second current paths further includes first and second sensing elements that are oppositely connected in series.

20 Claims, 7 Drawing Sheets

POWER FACTOR CORRECTION CIRCUIT

BACKGROUND

The present invention relates generally to a power converter system and, more particularly, to a bridgeless Power Factor Correction (PFC) circuit for a power converter circuit.

Figure 1:
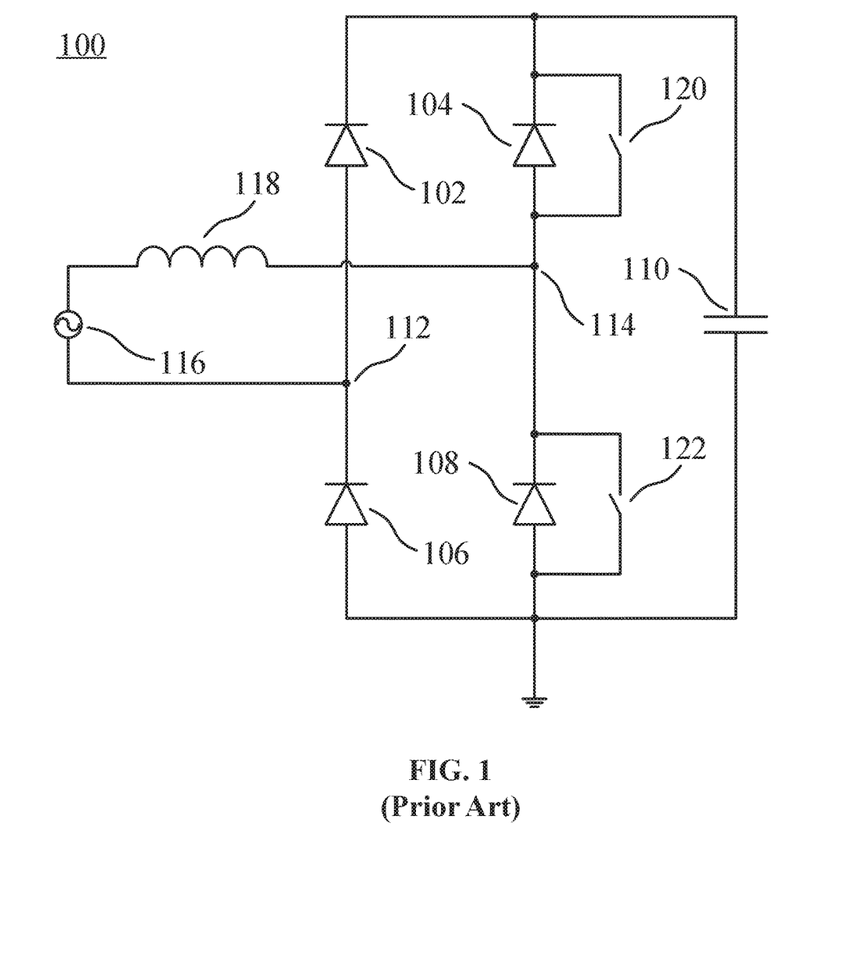
FIG. 1 is a schematic circuit diagram of a conventional PFC circuit.

FIG. 1 shows a conventional totem-pole bridgeless PFC circuit 100. The PFC circuit 100 includes first to fourth diodes 102, 104, 106, and 108, and a capacitor 110. The first and third diodes 102 and 106 are connected in series and are a first connection across the capacitor 110, and the second and fourth diodes 104 and 108 are connected in series and are a second connection across the capacitor 110. A first node 112 located between the first and third diodes 102 and 106 is connected to a current supply 116, while a second node 114 located between the second and fourth diodes 104 and 108 is connected to an inductor 118, which is connected in series with the current supply 116. The PFC circuit 100 further includes a first switch 120 and a second switch 122, which are respectively coupled across the second and the fourth diodes 104 and 108.

During a positive half cycle of the current supply 116, the second switch 122 is closed and the first switch 120 is open, such that the current supply 116 charges the inductor 118 by way of the second switch 122, the third diode 106, and the first node 112. When the charging is finished, the second switch 122 is opened and the first switch 120 is closed, such that the inductor 118 discharges to release the stored power by way of the first diode 102, the first switch 120, and the second node 114. On the other hand, during the negative half cycle of the current supply 116, the first switch 120 is closed and the second switch 122 is open, such that the current supply 116 charges the inductor 118 by way of the first diode 102, the first switch 120, and the second node 114. When the charging is finished, the first switch 120 is opened and the second switch 122 is closed, such that the inductor 118 discharges to release the stored power by way of the second switch 122, the third diode 106, and the first node 112.

It would be advantageous to have either a circuit with more efficient energy conversion or a less costly circuit.

SUMMARY

This summary is provided to introduce a selection of concepts in a simplified form that are further described below in the Detailed Description. This summary is not intended to identify key or essential features of the claimed subject matter, nor is it intended to be used to limit the scope of the claimed subject matter.

In one embodiment, the present invention provides a bridgeless power factor correction (PFC) circuit including first and second nodes, and first and second current paths connected between the first and second nodes. The first current path includes a first semiconductor device and a first switch element, and the second current path includes a second semiconductor device and a second switch element. One of the first and second current paths further includes a first and second sensing elements that are oppositely connected in series.

In another embodiment, the present invention provides a power converter circuit including a first branch and a second branch. The first branch includes a first current conduction element connected in series with a second current conduction element, wherein a first node between the first and second current conduction elements is couplable to receive an input current. The second branch is connected in parallel with the first branch, and includes a first switch element, a second switch element, a first sensing element, and a second sensing element, wherein a second node between the first and second switch elements is couplable to provide an output current. The first and second sensing elements are oppositely connected, and a serial connection of the first and second sensing elements is coupled between the second node and one of the first and second current conduction elements.

In yet another embodiment, the present invention provides a system including a first output terminal and a second output terminal. The system also includes a power supply having a first terminal and a second terminal, an inductor having a first terminal coupled to the second terminal of the power supply, and a second terminal, and first and second conduction devices respectively coupled between the first terminal of the power supply and the first and second output terminals. A first switch device and a second switch device are respectively coupled between the second terminal of the inductor and the first and second output terminals. A first current sensing device and a second current sensing device are connected in series between the second terminal of the inductor and one of the first and second output terminals.

BRIEF DESCRIPTION OF THE DRAWINGS

So that the manner in which the above recited features of the present invention can be understood in detail, a more detailed description of the invention may be had by reference to embodiments, some of which are illustrated in the appended drawings. The appended drawings illustrate only typical embodiments of the invention and should not limit the scope of the invention, as the invention may have other equally effective embodiments. The drawings are for facilitating an understanding of the invention and thus are not necessarily drawn to scale. Advantages of the subject matter claimed will become apparent to those skilled in the art upon reading this description in conjunction with the accompanying drawings, in which like reference numerals have been used to designate like elements, and in which:

DETAILED DESCRIPTION

Figure 2:
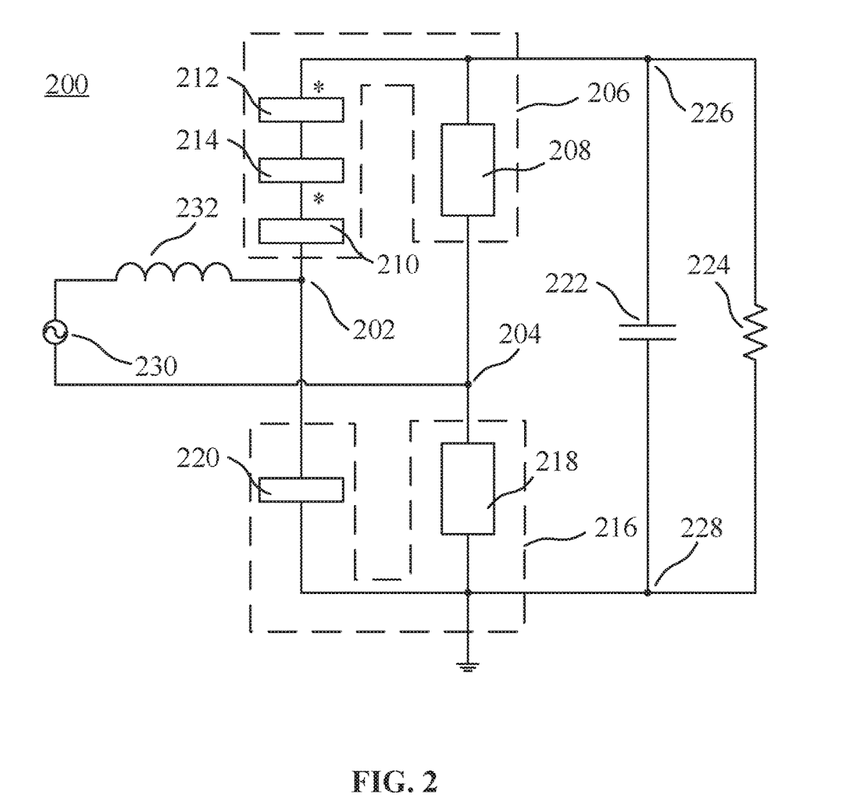
FIG. 2 is a schematic block diagram of a PFC circuit in accordance with a first embodiment of the present invention.

Referring to FIG. 2, a block diagram of a PFC circuit 200 in accordance with a first exemplary embodiment of the present invention is shown. The PFC circuit 200 includes a first current node 202 and a second current node 204. A first current path 206 between the first current node 202 and the second current node 204 includes a first semiconductor device or current conduction element 208, a first switch element 210, and a first and second sensing elements 212 and 214. The pair of sensing elements 212 and 214 are oppositely connected in series between the first semiconductor device 208 and the first switch element 210. The sensing elements 212 and 214 can be implemented as current transformers or Hall sensors. The "*" symbol shown in FIG. 2 depicts an anode of each of the sensing elements 212 and 214. In the illustrated embodiment, the cathodes of the first and second sensing elements 212 and 214 are connected together.

A second current path 216 between the first current node 202 and the second current node 204 includes a second semiconductor device or current conduction element 218 and a second switch element 220. A capacitor 222 and a resistor 224 are connected in parallel between a third node 226 and a fourth node 228. The third node 226 is located between the first current conduction element 208 and the first switch element 210, and the fourth node 228 is located between the second current conduction element 218 and the second switch element 220. The first and second current conduction elements 208 and 218 can be implemented as diodes, diode connected transistors, or transistors that are connected in parallel with switches, with the conduction elements being bypassed when the switches are closed. The first and second switch elements 210 and 220 may be implemented as transistors. The PFC circuit 200 further includes a power supply 230 and an inductor 232 that are connected in series between the first current node 202 and the second current node 204. In one embodiment, the power supply 230 comprises a current source.

In operation, the first and second current conduction elements 208 and 218 are closed, while the first and second switch elements 210 and 220 are controllable to be opened or closed to charge and discharge the inductor 232 in the respective current paths 206 and 216.

The first and second sensing elements 212 and 214 detect currents between the first current node 202 and the third or fourth node 226, 228. The pair of sensing elements 212 and 214 provide the sensed currents to a controller (not shown), and the controller accordingly provides control signals to close or open the first and second switch elements 210 and 220. The switch elements 210 and 220 are opened and closed according to the dynamic currents in the current paths, which improves the efficiency of the PFC circuit 200. The controlling of the switch elements 210 and 220 is similar to that used in conventional PFC schemes, and will not be described in detail herein.

It is shown in FIG. 2 that the pair of sensing elements 212 and 214 is connected in the first current path 206 and between the third node 226 and the first switch element 210. In an alternate embodiment, the pair of sensing elements 212 and 214 is connected in the second current path 216 and between the fourth node 228 and the second switch element 220.

Figure 3:
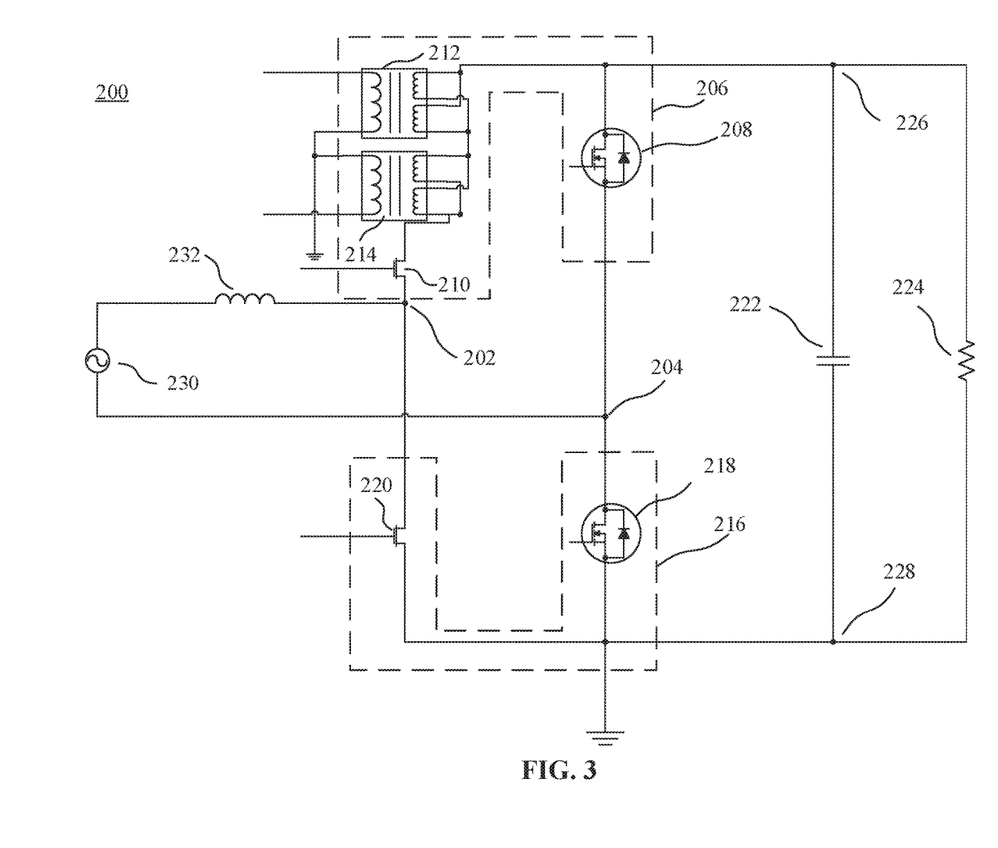
FIG. 3 is a more detailed schematic circuit diagram of the PFC circuit of FIG. 2.

FIG. 3 shows a circuit diagram of the PFC circuit 200 of FIG. 2. The first and second semiconductor devices 208 and 218 are implemented as transistors in this embodiment. As can be seen from FIG. 3, optional diodes are connected between the drain and source terminals of the transistors. The optional diodes can be parasitic diodes or discrete diodes.

The pair of sensing elements 212 and 214 are implemented as current transformers. Each of the current transformers 212 and 214 includes a first winding on a first side, and second and third windings on a second side. Each of the windings respectively has two terminals. The terminals of the first winding provide a sensed current. A terminal T3 of the first winding is connected to ground, and the other terminal T1 or T2 of the first winding provides the sensed current. One terminal of the second winding and one terminal of the third winding are connected together and connected in the first current path 206 and to the third node 226. The other terminal of the second winding and the other terminal of the third winding are connected together and to the other current transformer. Although the current transformers 212 and 214 are implemented to have two windings on the primary side, in other and applicable alternative embodiments, current transformers having one winding on the primary side may be used.

The first and second switch elements 210 and 220 are implemented as transistors in the current embodiment. Gate terminals of the transistors 210 and 220 receive control signals to switch the transistors on and off. In alternative embodiments, the switch elements 210 and 220 can be parallel connections of switches and diodes like those shown in FIG. 1. The transistors 210 and 220 are controllable to be conductive to save leakage and improve efficiency.

Figure 4:
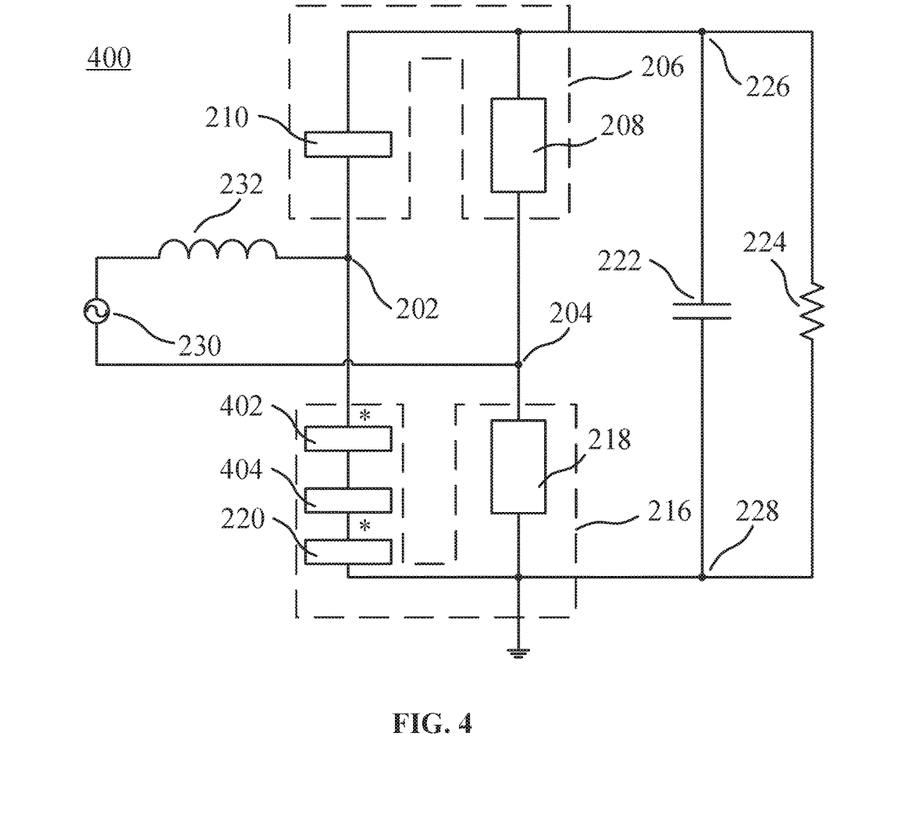
FIG. 4 is a schematic block diagram of a PFC circuit in accordance with a second embodiment of the present invention.

FIG. 4 is a block diagram of a PFC circuit 400 according to another exemplary embodiment of the present invention. The PFC circuit 400 is similar to the PFC circuit 200 shown in FIGS. 2 and 3. However, sensing elements 402 and 404 are oppositely connected in series in the second current path 216 between the first node 202 and the second switch element 220. Other components of the PFC circuit 400 are similar to those in the PFC circuit 200 of FIG. 2, which are labelled as the same and are not described in detail in the current embodiment.

As shown in FIG. 4, the pair of sensing elements 402 and 404 are connected in the second current path 216 and between the second switch element 220 and the first node 202. Alternatively, the pair of sensing elements 402 and 404 can be connected in the first current path 206 and between the first switch element 210 and the third node 226.

The PFC circuit 400 has a first branch that includes the first and second semiconductor devices 208 and 218, and a second branch that includes the first and second switch elements 210 and 220, and the pair of sensing elements 402 and 404. In the first branch, the first current conduction element 208 and the second current conduction element 218 are connected in series, and the second node 204, which is located between the current conduction elements 208 and 218, is coupled to receive an input current from the power supply 230. In the second branch, which is connected in parallel with the first branch, the first switch element 210, the second switch element 220, and the pair of sensing elements 402 and 404 are connected in series. The first node 202 is located between the first and second switch elements 210 and 220 is coupled to provide an output current to the inductor 232.

In alternative embodiments, the connection order of the components in the second branch varies, as long as the pair of sensing elements is connected on one side of the first node 202. The first and second sensing elements 402 and 404 are connected either between the first node 202 and the third node 226, or between the first node 202 and the fourth node 228. However, the order of the sensing elements and the corresponding connected switch element is flexible. Taking the first switch element 210, for example, in one embodiment, the first switch element 210 is connected between the first and second sensing elements. In other embodiments, the pair of sensing elements is connected between the first switch element 210 and the third node 226.

The power supply 230 has a first terminal T5 connected to the second node 204, and a second terminal T6 connected to a first terminal of the inductor 232, while a second terminal of the inductor 232 is connected to the first node 202. The first and second current conduction elements 208 and 218 are respectively connected between the first terminal T5 of the power supply 230 and the third and fourth nodes 226, 228. The third and fourth nodes 226 and 228 connect to output terminals of the PFC circuit to provide an output current. In this perspective, the first and second switch devices 210 and 220 are connected between the second terminal of the inductor 232 and the first and second output terminals.

Figure 5:
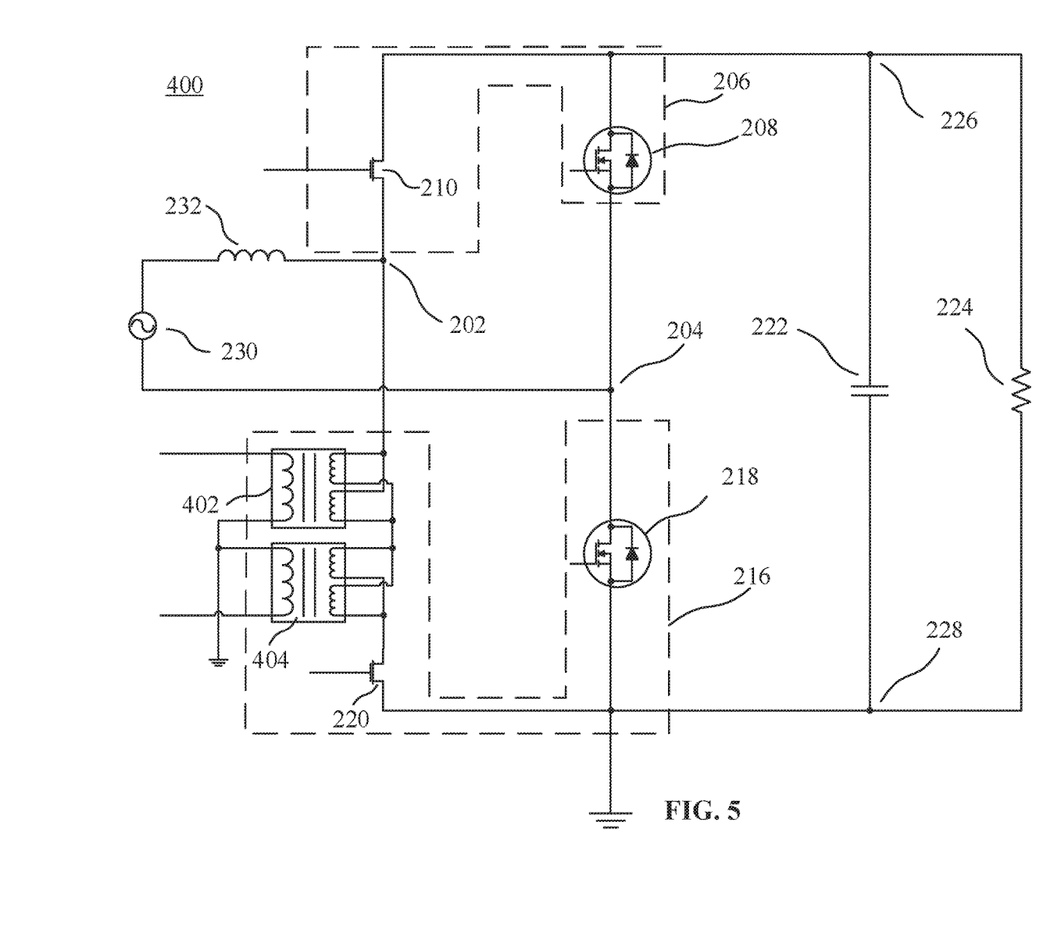
FIG. 5 is a schematic circuit diagram of the PFC circuit of FIG. 4.

FIG. 5 is a more detailed schematic circuit diagram of the PFC circuit 400 shown in FIG. 4. In FIG. 5, the first and second switch elements 210 and 220 comprise transistors that receive a PWM pulse signal at their gates. The first and second conductive elements 208 and 218 comprise transistors with diodes connected across the source and drain terminals. The first and second sampling elements 402 ad 404 comprise current transformers like the current transformers 212 and 214 described with reference to FIG. 3.

Figure 6A:
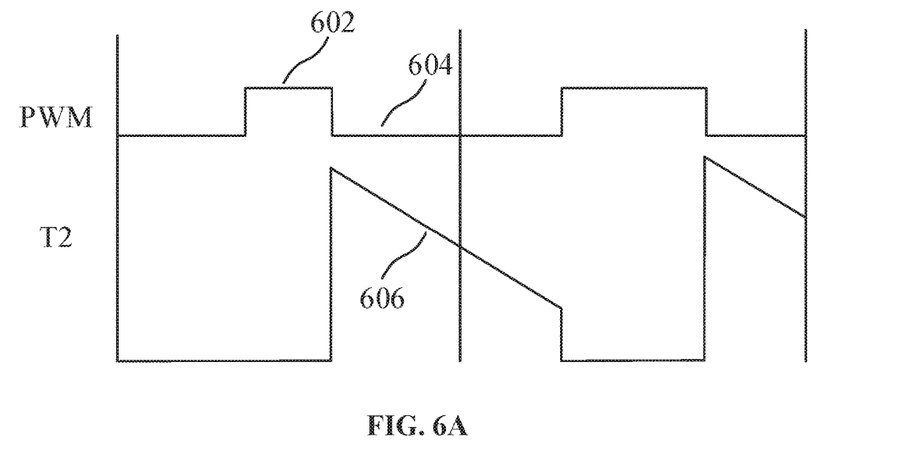
FIGS. 6A and 6B are signal wave form diagrams of a PWM signal used to control the main switch of FIGS. 2 and 3, and a sampled current therefrom, respectively, during positive and negative cycles of the power supply.

FIG. 6A shows exemplary signal wave forms of the PFC circuit 200 of FIG. 3 during a positive cycle of the power supply 230. In FIG. 6A, PWM is a control signal applied to the second switch device 220, and T2 indicates a current $I_{S\_H}$ at the terminal T2 of the current transformer 214. In the positive cycle of the power supply 230, the second terminal T6 is the positive side to provide the supply voltage.

During the charging stage, the first switch device 210 is switched off while the second switch device 220 is controlled to be conductive, as shown at 602 in FIG. 6A. A current in the circuit 200 flows from the second terminal T6 of the power supply 230 through the inductor 232, the second switch 220, the second current conduction element 218 and to the first terminal T5 of the power supply 230. The power supply 230 thus charges the inductor 232. Because the current does not flow through the pair of current sensing elements 212 and 214, no current is sampled.

Subsequently in a free-wheeling stage, the first switch device 210 is controlled by the PWM signal to be conductive while the second switch device 220 is controlled to be off, as indicated at 604 in FIG. 6A. Current flows from the inductor 232 through the first switch device 210, the pair of sensing elements 214 and 212, the capacitor 222, and the second current conduction element 218, and discharges the inductor 232. During this free-wheeling stage, an output at the terminal T2 of the current transformer 214 reflects the current through the inductor 232, which decreases from a high level at the end of the charging stage until a next PWM signal pulse, as indicated at 606 in FIG. 6A. The sensed current is provided to the controller to calibrate the next duration of the PWM signal pulse.

Figure 6B:
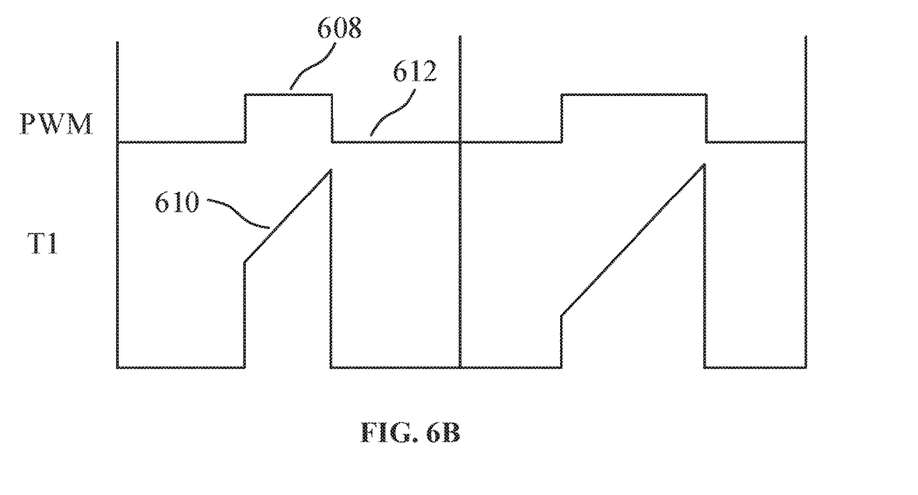

Referring to FIG. 6B, which shows the PWM signal that is applied to the main switch and a sampled current that is provided at the terminal T1 of the current transformer 212 of FIGS. 2 and 3 in a negative cycle of the power supply 230. During the negative cycle of the power supply 230, the first terminal T5 is the positive side to provide the supply voltage, and the main switch is the first switching device 210.

During the charging stage, the first switch device 210 is controlled to be conductive as indicated at 608 in FIG. 6B, while the second switch device 220 is turned off. A current in the circuit 200 flows from the terminal T5 of the power supply 230 and subsequently through the second current node 204, the first current conduction element 208, the pair of current sensing elements 212 and 214, the first switch device 210, the inductor 232, and back to the terminal T6. The sampled current provided at the terminal T1 of the current transformer 212 shows an increase of the current through the inductor 232, as shown at 610 in FIG. 6B. In a subsequent free-wheeling stage, the first switch device 210 is turned off by the PWM signal, as shown at 612 in FIG. 6B, while the second switch device 220 is turned on. Current flows from the inductor 232 through the second current node 204, the first switch device 208, the third node 226, the capacitor 222, the fourth node 228, the second switch device 220 and back to the power supply 230, which discharges the inductor 232. Because the free-wheeling current does not flow though the pair of current sensing elements 212 or 214, no current is sampled.

Figure 7A:
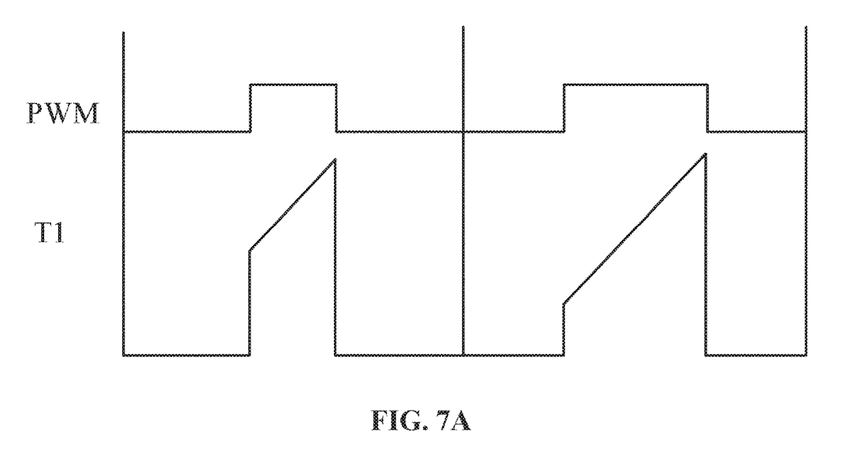
FIGS. 7A and 7B are signal wave forms of a PWM signal used to control the main switch of FIGS. 4 and 5, and a sampled current therefrom, respectively, during positive and negative cycles of the power supply.
Figure 7B:
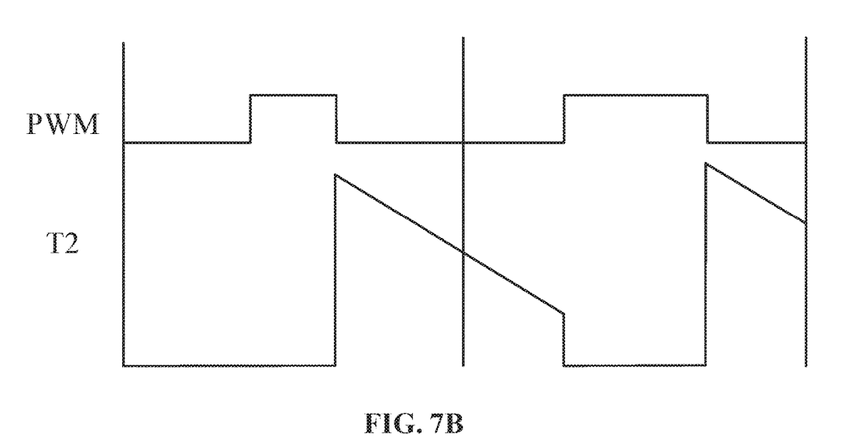

FIGS. 7A and 7B are exemplary forms of the main switch control signal PWM and sampled currents of FIGS. 4 and 5 respectively during a positive and a negative cycle of the power supply 230. In detail, during the positive cycle of the power supply 230, the main switch is the second switch device 220, and the current is sampled through the terminal T1 of the first current transformer 402. During the negative cycle of the power supply 230, the main switch is the first switch device 210, and the current is sampled through the terminal T2 of the second current transformer 404.

Taking the signal form at T2 in FIG. 6A for example, during the presence 602 of the PWM signal pulse, the current through the inductor 232 is not sampled because the current does not flow through the current sensing elements 212 and 214. However, in other embodiments, the current that is sampled during the slope 606 (FIG. 6A) is used to imitate the current when the PWM signal pulse is high, because charging and discharging of the inductor 232 exhibits nearly mirrored changes in the current.

It can now be seen from the embodiment that the present invention senses and samples the current in the power converter circuit and accordingly controls the switches in the circuit, the switching of the circuit is accordingly reliable and dynamic with the changes in the current of the circuit. The conversion efficiency is improved because the switching of the circuit is more precise.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are intended merely to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

The invention claimed is:

1. A bridgeless power factor correction (PFC) circuit, comprising:
   a first node and a second node, wherein one of the first and second nodes is connected to a power supply, and the other of the first and second nodes is connected to the power supply through an inductor;
   a first current path including a first semiconductor device and a first switch element, wherein the first current path is connected between the first and second nodes and configured to allow current to flow during a positive cycle of the power supply to charge the inductor; and
   a second current path including a second semiconductor device and a second switch element, wherein the second current path is connected between the first and second nodes and configured to allow current to flow during a negative cycle of the power supply to charge the inductor,
   wherein one of the first and the second current paths further comprises a first sensing element and a second sensing element, wherein the first and second sensing elements are oppositely connected in series.

2. The circuit of claim 1, wherein the first and second switch elements are configured to be controllable to conduct currents in the respective current paths.

3. The circuit of claim 1, wherein each of the first and the second semiconductor devices is one of a diode, a diode connected transistor, and a transistor.

4. The circuit of claim 1, wherein each of the first and second sensing elements is one of a current transformer and a Hall sensor.

5. The circuit of claim 1, wherein cathodes of the first and second sensing elements are connected together.

6. The circuit of claim 1, wherein the serial connection of the first and second sensing elements is connected between the semiconductor device and the switch element of the respective current path.

7. The circuit of claim 1, wherein the serial connection of the first and second sensing elements is connected between the switch element of the respective current path and one of the first and the second nodes.

8. A power converter circuit, comprising:
   a first branch comprising a first current conduction element and a second current conduction element, wherein a first node is located between the first current conduction element and the second current conduction element, and is couplable to a first terminal of a power supply; and
   a second branch connected in parallel with the first branch, wherein the second branch comprises a first switch element, a second switch element, a first sensing element, and a second sensing element, wherein a second node between the first switch element and the second switch element is couplable to a second terminal of the power supply through an inductor,
   wherein the first and second sensing elements are oppositely connected, and a series connection of the first and second sensing elements is coupled between the second node and one of the first and second current conduction elements, and
   wherein one of the first and second sensing elements samples current during a positive cycle of the power supply, while the other of the first and second sensing elements samples current during a negative cycle of the power supply.

9. The power converter circuit of claim 8, wherein each of the first and second current conduction elements is one of a diode, a diode connected transistor, and a transistor.

10. The power converter circuit of claim 8, wherein the first and the second switch elements are transistors that are controllable to be conductive to conduct currents to and/or from the second node.

11. The power converter circuit of claim 8, wherein each of the first and second sensing elements is one of a current transformer and a Hall sensor.

12. The power converter circuit of claim 8, wherein cathodes of the first and second sensing elements are connected to each other.

13. The power converter circuit of claim 8, wherein the first sensing element is a current transformer connected between the second node and the second sensing element, and the first sensing element comprises:
   a first winding on a first side, wherein the first winding has two terminals providing a sensed current;
   a second winding and a third winding on a second side, wherein each of the second and third windings has a terminal connected together, and another terminal connected together to the second sensing element.

14. The power converter circuit of claim 13, wherein the second sensing element is a current transformer connected between the first sensing element and the one of the first and second switch elements, and the second sensing element comprises:
   a first winding on a first side, wherein the first winding has two terminals providing a sensed current;
   a second winding and a third winding on a second side, wherein each of the second and third windings has a terminal connected in common, and another terminal connected together to the terminals of the second and third windings on the second side of the first sensing element.

15. A system having first and second output terminals, the system comprising:
   a power supply having a first terminal and a second terminal;
   an inductor having a first terminal coupled to the second terminal of the power supply, and a second terminal;
   first and second conduction devices respectively coupled between the first terminal of the power supply and the first and second output terminals;
   first and second switch devices respectively coupled between the second terminal of the inductor and the first and second output terminals; and
   first and second current sensing devices connected in series between the second terminal of the inductor and one of the first and second output terminals,
   wherein one of the first and second current sensing devices samples current through a respective one of the first or second switch devices during a first half cycle of the power supply, while the other of the first and second current sensing devices samples current through the one of the first or second switch devices during a second half cycle of the power supply.

16. The system of claim 15, wherein the first and second current sensing devices are coupled between the first switch device and the first output terminal.

17. The system of claim 15, wherein the first and second current sensing devices are coupled between the second terminal of the inductor and the second switch device.

18. The system of claim 15, wherein cathodes of the first and second current sensing devices are coupled to each other.

19. The system of claim 15, wherein each of the first and second current sensing devices is one of a current transformer and a Hall sensor.

20. The system of claim 15, wherein each of the first and second conduction devices is one of a diode, a diode-connected transistor, and a transistor.

* * * * *